Patented Oct. 7, 1924.

1,510,706

UNITED STATES PATENT OFFICE.

JOSEPH H. RUSSELL, OF NAUGATUCK, CONNECTICUT, ASSIGNOR TO RUBBER RE-GENERATING COMPANY, A CORPORATION OF INDIANA.

PROCESS OF RECLAIMING RUBBER.

No Drawing. Application filed October 27, 1920. Serial No. 419,869.

*To all whom it may concern:*

Be it known that I, JOSEPH H. RUSSELL, a citizen of the United States, residing at Naugatuck, county of New Haven, State of Connecticut, have invented certain new and useful Improvements in Processes of Reclaiming Rubber, of which the following is a specification.

My invention relates to the reclaiming of vulcanized rubber waste, particularly that which contains no fabric or fibrous material or from which the fabric or fibrous material has previously been removed.

In previous processes for devulcanizing or reclaiming rubber the cheap inorganic accelerators have suggested themselves as being very desirable, but their use necessitated the addition of other reagents more or less expensive to assist the action of the devulcanizing agent. Furthermore the results of such processes have not been entirely satisfactory from the standpoint of the qualities of the reclaimed rubber, nor have the processes themselves possessed sufficient technical efficiency.

This invention has accordingly as an object a new process of reclaiming rubber in a minimum of time and at comparatively low temperatures whereby the resulting product shall be of superior quality as manifested by its superior tensile strength and ageing qualities. Another object of the invention is to make use of cheap inorganic devulcanizing agents in an efficient manner and with economy of materials.

The invention broadly stated consists in a process of reclaiming rubber comprising swelling the rubber with a volatile swelling agent substantially without dissolving the rubber, and devulcanizing the rubber with an alkaline devulcanizing agent miscible and forming a solution with the swelling agent.

A preferred method of conducting the process of the invention consists in finely dividing the rubber waste by grinding and placing it in a strong iron vessel which can be tightly sealed and is equipped to be heated by steam and in which the contents can be agitated by some suitable agitator. For every hundred pounds of rubber waste in the vessel there are added about twelve gallons of methyl ethyl ketone, and about ten pounds of caustic soda dissolved in a minimum amount of water, and the vessel is then carefully sealed and the contents agitated. Steam is turned into the heating system of the vessel which is jacketed for this purpose and the contents raised to a temperature of about 332° F., the steam being at 90 lbs pressure in the jacket. The contents are subjected to heat and agitation for from nine to twelve hours depending on the nature of the waste rubber and the vessel is then allowed to cool, opened, and the liquor is drained off from the treated waste. This liquor could be used over again after being made up to the required volume with fresh ketone. The treated waste is then washed, dried and finished by the well-known methods used in finishing ordinary reclaimed rubber. The product of this process possesses a tensile strength considerably greater than that of other reclaimed rubbers.

The above example of a preferred process is capable of wide variation in details and reagents. Caustic soda is a very good, cheap, and efficient devulcanizing agent, but caustic potash, ammonia, soda ash, potassium carbonate, or other cheap alkali may be used. The metallic oxides and the alkaline earth oxides are generally unsuitable because of their comparative insolubility, since it is desired to use a freely soluble devulcanizing agent, so that it may permeate the rubber in large quantities.

The ketone used may be acetone, methyl acetone, methyl ethyl ketone, acetone oil (that is the oily residuum obtained as a by product in the distillation of acetone), or fractionated products of acetone oil, or any of the other ketones which are fairly water soluble or emulsifiable with water and are capable of swelling the rubber. The boiling point of the ketones rises on passing up the series and the solubility rapidly decreases, consequently the efficiency of the ketone decreases in ascending the series. By the term "simple ketones" I mean acetone, methyl ethyl ketone, methyl acetone, acetone oil and its lower fractions, and any other lower member of the ketone series which is soluble in water and is capable of swelling the rubber.

The temperatures of the steam used in heating the vessel will vary according to the ketone and rubber waste and according to the devulcanizing agent used in some degree, but the temperature will average about 330° F. and lie within a range of 250° F. to 366° F. corresponding to 17 pounds to 150 lbs. steam pressure. The temperature will also vary with the time of treatment and as a general rule the longer the treatment is continued the lower may be the temperature employed. In particular cases the temperature may vary somewhat outside of these limits. But it will be limited in its lower range by the temperature of vulcanization of rubber for the alkali accelerating agents used obviously will not act below the vulcanization temperature. The time of treatment ranges generally from 9 to 12 hours but it may run from 7 to 15 hours depending on conditions as aforesaid.

As a result of the above processes, rubber waste may be devulcanized by the cheap inorganic accelerators or devulcanizing agents in a very efficient manner and with a minimum of expense of time and money. The rubber waste is treated with the water soluble devulcanizing agent which is normally slow in penetrating the rubber but whose penetration is facilitated by a ketone which is capable of swelling the rubber thereby enlarging the pores and admitting the solution of devulcanizing agent, the ketone being itself miscible with or soluble in water to a large extent so that it will not repel the devulcanizing agent from entering. In other words the water furnishes a medium for the swelling agent and the devulcanizing agent to operate in without hindrance. The fault of prior processes has been in providing a swelling agent which was not soluble in the solvent of the devulcanizing agent with the result that the latter was repelled from the rubber to a great extent. Rubber reclaimed by use of the above processes has exceptionally good tensile strength and ageing qualities, due very likely to the completeness of the entry of the alkali or other agent into the pores of the rubber and the efficient swelling of the rubber whereby the free sulphur is thoroughly removed by the alkali or similar agent and the rubber devulcanized. It is evident therefore that the objects of the invention have been achieved.

Having thus described my invention, what I claim and desire to protect by Letters Patent is:

1. A process of reclaiming rubber comprising treating the rubber with an aqueous solution of an alkaline devulcanizing agent and with a ketone capable of swelling the rubber, the process being conducted by heating the mixture in a closed vessel.

2. The process of reclaiming rubber comprising treating it with a water solution of an alkali and with a ketone soluble in water and capable of swelling the rubber, the process being conducted by heating in a closed vessel.

3. The process of reclaiming rubber comprising treating it with an aqueous solution of an alkaline devulcanizing agent and with a simple ketone capable of swelling the rubber, the process being conducted by heating in a closed vessel.

4. The process of reclaiming rubber comprising treating it with an aqueous solution of an alkali and with a simple ketone capable of swelling the rubber, the process being conducted by heating in a closed vessel.

5. The process of reclaiming rubber comprising treating it with an aqueous solution of caustic soda and with methyl ethyl ketone, the process being conducted by heating in a closed vessel.

6. The process of reclaiming rubber comprising treating it with an aqueous solution of caustic soda, and with a simple ketone capable of swelling the rubber, the process being conducted by heating in a closed vessel.

7. The process of reclaiming rubber comprising treating it in finely ground condition with an alkali dissolved in a small amount of water and with a ketone capable of swelling the rubber, agitating and heating the rubber in a sealed vessel at a temperature lying between 250–360° F. for from 7 to 15 hrs., and washing, drying, and finishing the rubber.

8. The process of reclaiming rubber comprising treating the finely ground rubber with caustic soda dissolved in a small amount of water and with methyl ethyl ketone in the approximate proportions of 100 pounds rubber, 10 lbs. soda, 12 gallons ketone, agitating and heating the rubber in a sealed vessel at about 332° F. for several hours, then washing, drying, and finishing the rubber.

9. A process of reclaiming rubber comprising swelling the rubber with a volatile swelling agent substantially without dissolving the rubber, and devulcanizing the rubber with an alkaline devulcanizing agent miscible and forming a solution with the swelling agent.

10. A process of reclaiming rubber comprising swelling the rubber with a ketone substantially without dissolving the rubber, and devulcanizing the rubber with an alkaline devulcanizing agent miscible with the ketone.

11. A process of reclaiming rubber comprising swelling the rubber with a water soluble ketone substantially without dissolving the rubber, and devulcanizing the rubber with a water solution of an alkaline devulcanizing agent.

12. A process of reclaiming rubber comprising swelling the rubber with methyl ethyl ketone, and devulcanizing the so-treated rubber with a water solution of caustic soda.

Signed at Naugatuck, county of New Haven, State of Connecticut, this 19th day of Oct., 1920.

JOSEPH H. RUSSELL.